United States Patent
Xu et al.

(10) Patent No.: US 9,357,534 B2
(45) Date of Patent: May 31, 2016

(54) METHOD AND APPARATUS FOR LOCATION AIDED HIGH FREQUENCY OPERATIONS

(71) Applicant: QUALCOMM Incorporated, San Diego, CA (US)

(72) Inventors: Hao Xu, San Diego, CA (US); Omar El Ayach, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 14/338,934

(22) Filed: Jul. 23, 2014

(65) Prior Publication Data

US 2015/0045048 A1  Feb. 12, 2015

Related U.S. Application Data

(60) Provisional application No. 61/864,423, filed on Aug. 9, 2013.

(51) Int. Cl.
| | |
|---|---|
| *H04W 72/00* | (2009.01) |
| *H04W 24/00* | (2009.01) |
| *H04W 72/04* | (2009.01) |
| *H04W 64/00* | (2009.01) |
| *H04W 76/02* | (2009.01) |
| *H04W 4/02* | (2009.01) |
| *H04W 88/06* | (2009.01) |
| *H04W 16/28* | (2009.01) |

(52) U.S. Cl.
CPC .......... *H04W 72/0413* (2013.01); *H04W 4/023* (2013.01); *H04W 64/00* (2013.01); *H04W 76/02* (2013.01); *H04W 16/28* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 6,999,795 | B2 | 2/2006 | Chitrapu et al. |
| 8,116,675 | B2 | 2/2012 | Lee et al. |
| 2006/0111149 | A1 | 5/2006 | Chitrapu et al. |
| 2008/0181180 | A1 | 7/2008 | Karaoguz |
| 2009/0167599 | A1 * | 7/2009 | Johnson .................. H04W 4/02 342/357.48 |

(Continued)

FOREIGN PATENT DOCUMENTS

| | | | | |
|---|---|---|---|---|
| EP | 2405687 | A1 | 1/2012 | |
| GB | 2448510 | A * | 10/2008 | ............. H01Q 1/125 |
| WO | WO-9816077 | A2 | 4/1998 | |
| WO | WO-2013089731 | A1 | 6/2013 | |

OTHER PUBLICATIONS

Cai L.X., et al., "REX: A Randomized EXclusive Region Based Scheduling Scheme for mmWave WPANs with Directional Antenna," IEEE Transactions on Wireless Communications, Jan. 2010, vol. 9 (1), pp. 113-121.

(Continued)

*Primary Examiner* — Erika A Washington
(74) *Attorney, Agent, or Firm* — Norton Rose Fulbright US LLP

(57) ABSTRACT

Wireless communication systems and methods are described in which a network device may establish a connection with a user device within a wireless network. Through this connection location information regarding the user device is received. Based on the received location information, a second network device may be configured to beamform a high-frequency communication transmission session with the user device.

30 Claims, 7 Drawing Sheets

(56) References Cited

U.S. PATENT DOCUMENTS

2010/0151865 A1* 6/2010 Camp, Jr. ............ H04W 72/046
455/445
2013/0039345 A1* 2/2013 Kim .................... H04W 72/046
370/332
2013/0095836 A1* 4/2013 Carmon ............ H04W 52/0206
455/438

OTHER PUBLICATIONS

International Search Report and Written Opinion—PCT/US2014/047954—ISA/EPO—Sep. 10, 2015.
International Search Report and Written Opinion—PCT/US2014/047954—ISA/EPO—Jan. 26, 2016.

* cited by examiner

METHOD AND APPARATUS FOR LOCATION AIDED HIGH FREQUENCY OPERATIONS

CROSS-REFERENCE TO RELATED APPLICATIONS

This application claims the benefit of U.S. Provisional Patent Application No. 61/864,423, entitled, "METHOD AND APPARATUS FOR LOCATION AIDED HIGH FREQUENCY OPERATIONS", filed on Aug. 9, 2013, which is expressly incorporated by reference herein in its entirety.

BACKGROUND

1. Field

Aspects of the present disclosure relate generally to wireless communication systems, and more particularly, to establishing and maintaining high frequency communications in a wireless network.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

In general, wireless communications networks implement the aforementioned uplink and downlink communications between base stations and UEs using a low frequency carrier signal (e.g. 400 MHz-3 GHz). For example, current 3G networks utilize 850, 1700, 1900 and 2100 MHz frequencies and current 4G technologies utilize 700, 800, 1700, 1900, 2100 and 2500 MHz frequencies. Low frequency carrier signals provide certain advantages which have assisted with the widespread deployment of wireless networks. Such frequencies provide for a balance of coverage area range capabilities and the ability to handle a large number of UEs.

It is generally understood that the higher the frequency utilized, the smaller the available coverage area becomes. This is true even within the range of low frequency networks (e.g. 1900 MHz transmissions generally do not cover as much distance as an 800 MHz transmission). Further, it is understood that use of the higher end of the low frequency range, such as 1900 MHz, allows for higher bandwidth and the ability to provide service to more UEs.

Wireless communication networks generally do not utilize frequencies in a much higher range, e.g. 20 GHz-60 GHz because such high frequency signals would suffer multiple drawbacks if they were to be deployed in a wireless communication network setting. For example, at a frequency of 28 GHz, the free space path loss of a signal is 20 dB larger than a 2 GHz signal. Oxygen absorption and other atmospheric conditions (e.g. presence of rain, water vapor and the like) also impact high frequency signals more adversely. Penetration loss is also much larger at high frequencies when a signal encounters buildings, foliage, etc. Because of this, high frequency communications are not utilized in typical wireless communications networks.

Further, communication at high frequencies often requires line of sight (LOS) connections. This raises multiple technical challenges for initially aligning a beam which facilitates a connection and maintaining communications between a base station and a UE, especially in an environment where the UE is mobile. For example, current beam scanning methods, e.g. utilized in IEEE 802.15.3c, require successive scans and beam refinements using layered training and feedback techniques. The successive scans eventually lead to a beam alignment between a base station and a UE, but such an alignment takes a considerable amount of time. Additionally, these methods are limited in the types of environments that may be utilized. For example, such beam scanning is usually only implemented in short range indoor systems with reasonable signal to noise ratio properties and will also usually allow for wide beams.

SUMMARY

In one aspect of the disclosure, a method of wireless communication includes establishing, by a network device, a connection with a user device within a wireless network, receiving location information regarding the user device, and configuring a second network device to beamform a high-frequency communication transmission to the user device based on the received location information.

In an additional aspect of the disclosure, a method of wireless communication includes establishing, by a user device, a connection with a network device within a wireless network, providing location information corresponding to the user device to the network device, and establishing a high-frequency communication connection by the user device with a network device which has been beam-formed based on the provided location information.

In an additional aspect of the disclosure, an apparatus configured for wireless communication includes means for establishing, by a network device, a connection with a user device within a wireless network, means for receiving location information regarding the user device, and means for configuring a second network device to beamform a high-frequency communication transmission to the user device based on the received location information.

In an additional aspect of the disclosure, an apparatus configured for wireless communication includes means for establishing, by a user device, a connection with a network device within a wireless network, means for providing location information corresponding to the user device to the network device, and means for establishing a high-frequency communication connection by the user device with a network device which has been beam-formed based on the provided location information.

In an additional aspect of the disclosure, an apparatus configured for wireless communication includes at least one processor and a memory coupled to the processor. The processor is configured to establish, by a network device, a connection with a user device within a wireless network, to receive location information regarding the user device, and to configure a second network device to beamform a high-frequency communication transmission to the user device based on the received location information.

In an additional aspect of the disclosure, an apparatus configured for wireless communication includes at least one processor and a memory coupled to the processor. The processor is configured to establish, by a user device, a connection with a network device within a wireless network, to provide location information corresponding to the user device to the network device, and to establish a high-frequency communication connection by the user device with a network device which has been beam-formed based on the provided location information.

In an additional aspect of the disclosure, a computer program product has a computer-readable medium having program code recorded thereon. This program code includes code to establish, by a network device, a connection with a user device within a wireless network, code to receive location information regarding the user device, and code to configure a second network device to beamform a high-frequency communication transmission to the user device based on the received location information.

In an additional aspect of the disclosure, a computer program product has a computer-readable medium having program code recorded thereon. This program code includes code to establish, by a user device, a connection with a network device within a wireless network, code to provide location information corresponding to the user device to the network device, and code to establish a high-frequency communication connection by the user device with a network device which has been beam-formed based on the provided location information.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
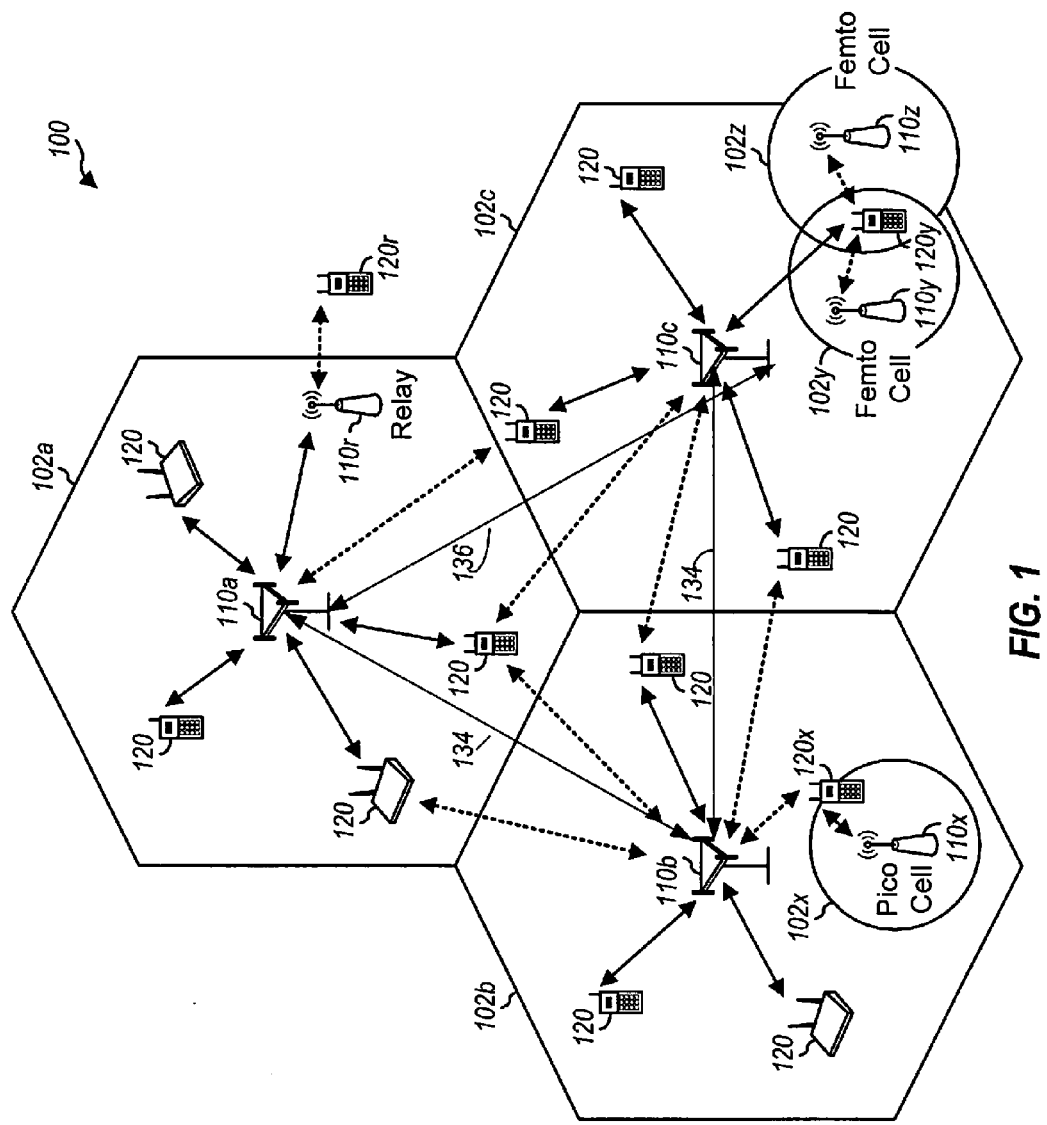
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
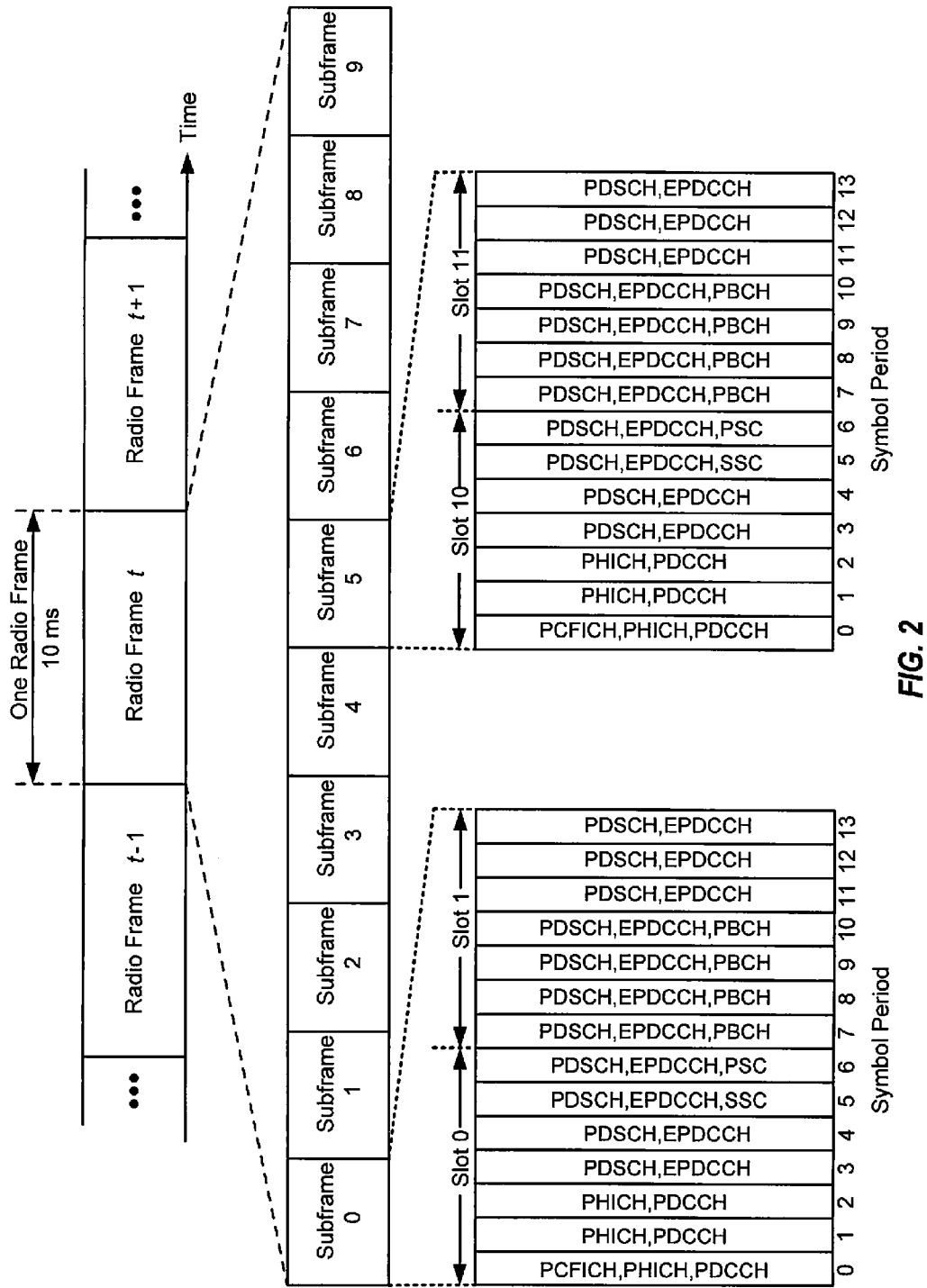
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Enhanced-Physical Downlink Control Channel (EPDCCH) is included in the later symbol periods of each subframe. The EPDCCH is a new type of control channel. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
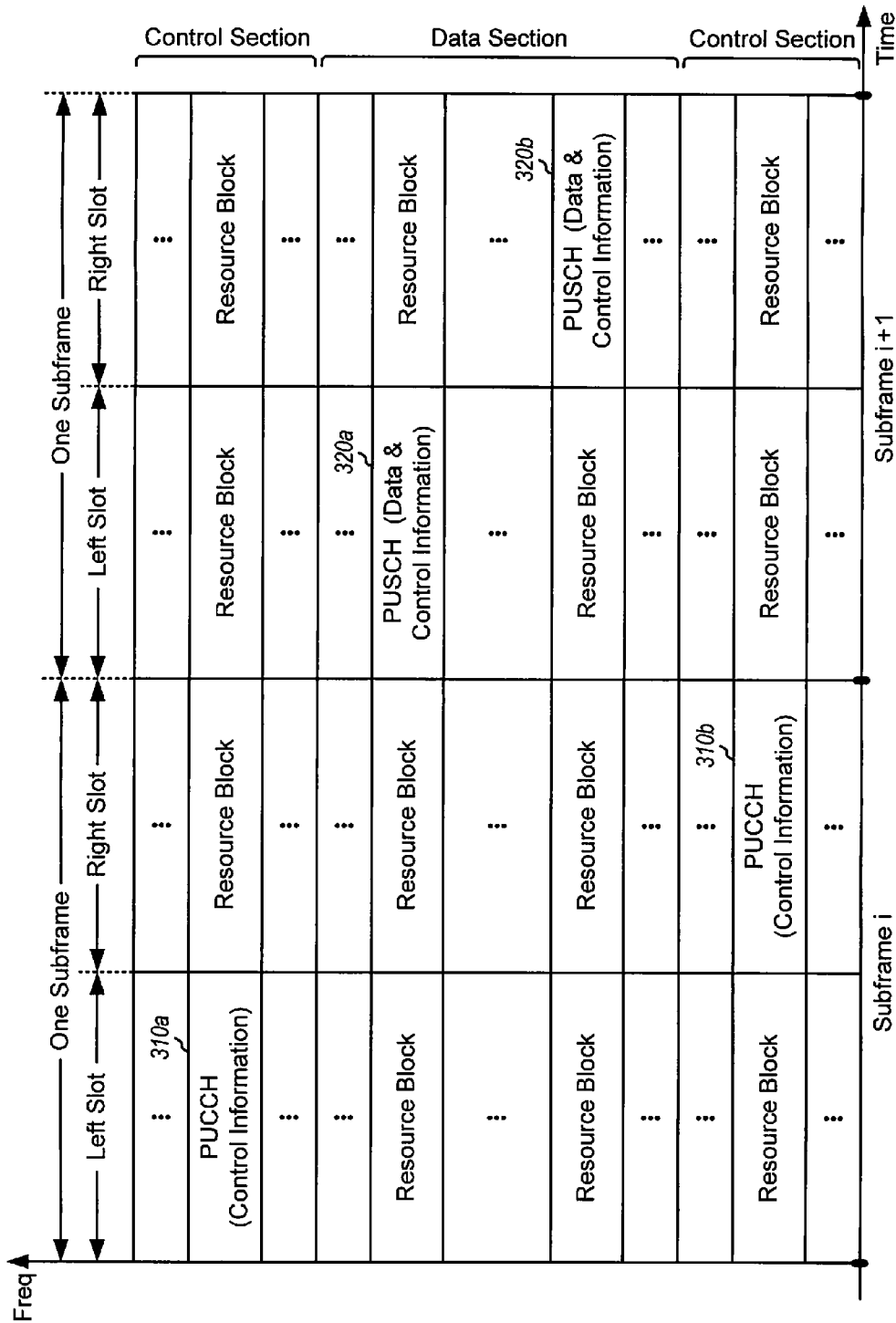
FIG. 3 is a block diagram conceptually illustrating an exemplary frame structure in uplink LTE/-A communications.

FIG. 3 is a block diagram illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
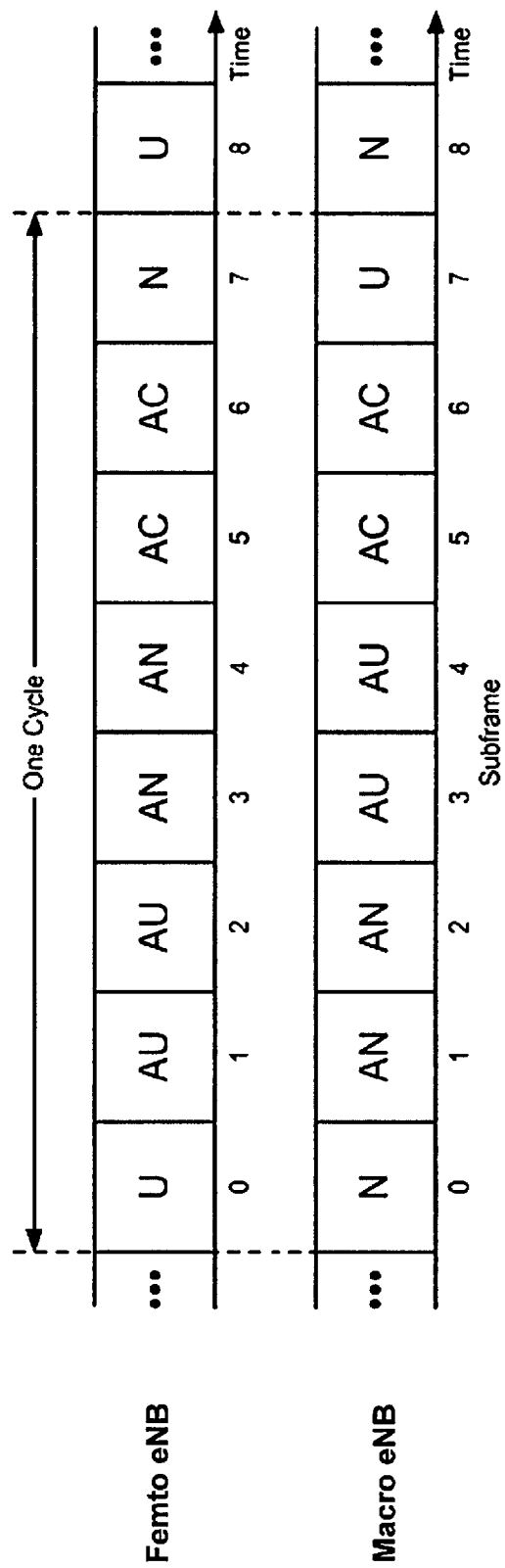
FIG. 4 is a block diagram conceptually illustrating time division multiplexed (TDM) partitioning in a heterogeneous network according to one aspect of the disclosure.

FIG. 4 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities. This central entity may not always be practical or even desirable. Therefore, in alternative aspects a distributed algorithm may be used that makes resource usage decisions based on the channel information from a certain set of nodes.

Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 μs (5 km÷3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 5:
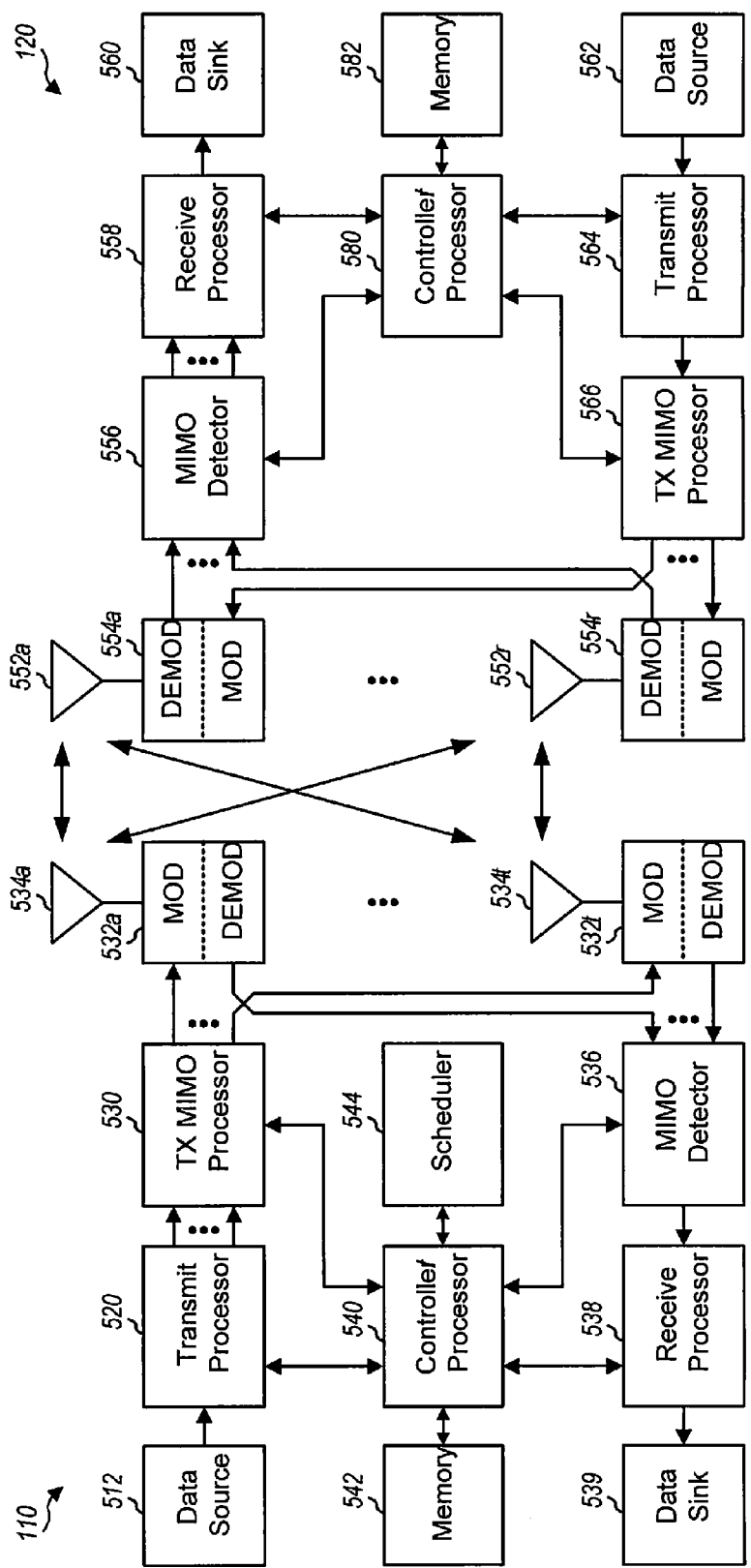
FIG. 5 is a block diagram conceptually illustrating a design of a base station/eNB and a UE configured according to one aspect of the present disclosure.

FIG. 5 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 534a through 534t, and the UE 120 may be equipped with antennas 552a through 552r.

At the eNB 110, a transmit processor 520 may receive data from a data source 512 and control information from a controller/processor 540. The control information may be for the PBCH, PCFICH, PHICH, PDCCH, etc. The data may be for the PDSCH, etc. The transmit processor 520 may process (e.g., encode and symbol map) the data and control information to obtain data symbols and control symbols, respectively. The transmit processor 520 may also generate reference symbols, e.g., for the PSS, SSS, and cell-specific reference signal.

A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 120, the antennas 552a through 552r may receive the downlink signals from the eNB 110 and may provide received signals to the demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 120 to a data sink 560, and provide decoded control information to a controller/processor 580.

On the uplink, at the UE 120, a transmit processor 564 may receive and process data (e.g., for the PUSCH) from a data source 562 and control information (e.g., for the PUCCH) from the controller/processor 580. The transmit processor 564 may also generate reference symbols for a reference signal. The symbols from the transmit processor 564 may be precoded by a TX MIMO processor 566 if applicable, further processed by the demodulators 554a through 554r (e.g., for SC-FDM, etc.), and transmitted to the eNB 110. At the eNB 110, the uplink signals from the UE 120 may be received by the antennas 534, processed by the modulators 532, detected by a MIMO detector 536 if applicable, and further processed by a receive processor 538 to obtain decoded data and control information sent by the UE 120. The processor 538 may provide the decoded data to a data sink 539 and the decoded control information to the controller/processor 540.

The controllers/processors 540 and 580 may direct the operation at the eNB 110 and the UE 120, respectively. The controller/processor 540 and/or other processors and modules at the eNB 110 may perform or direct the execution of various processes for the techniques described herein. The controllers/processor 580 and/or other processors and modules at the UE 120 may also perform or direct the execution of the functional blocks illustrated in FIGS. 8 and 9, and/or other processes for the techniques described herein. The memories 542 and 582 may store data and program codes for the eNB 110 and the UE 120, respectively. A scheduler 544 may schedule UEs for data transmission on the downlink and/or uplink.

Figure 6:
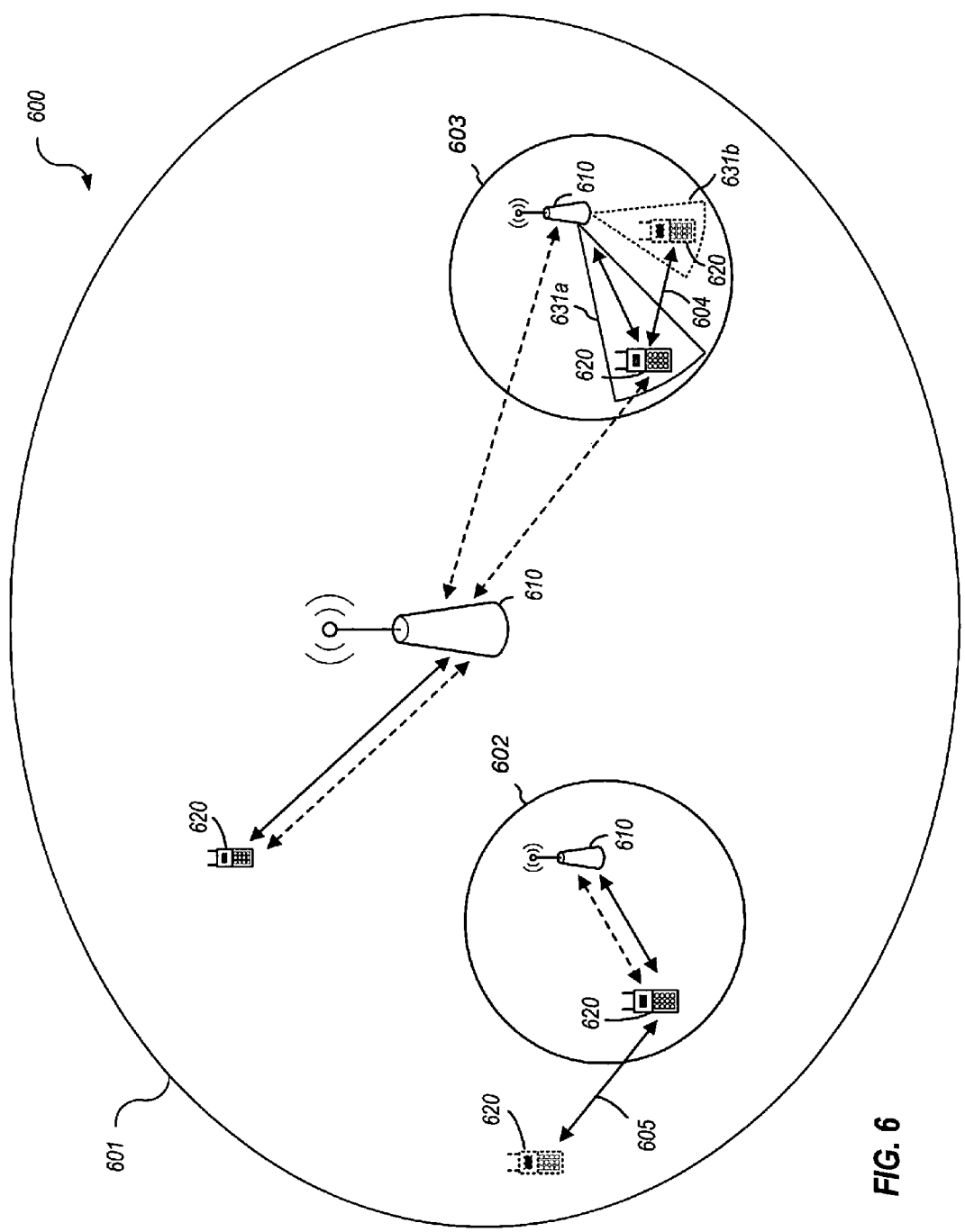
FIG. 6 is block diagram conceptually illustrating an example of a mobile communication system

FIG. 6 shows a wireless network 600 for communication in accordance with various aspects. Network 600 includes a multiple eNBs 610. Each eNB 610 may provide communication coverage for a particular geographic area, for example, macro cell 601 and multiple small cells 602-603 are provided. It is noted that macro cell 601 may be implemented with the functionality described above with respect to eNB 110 and small cells 602-604 may be implemented as pico cells, femto cells and/or other types of cells as discussed above with respect the system of FIG. 1.

The UEs 620 are dispersed throughout the wireless network 600, and each UE may be stationary or mobile. As with UE 120, UE 620 may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may have varying capabilities and in some cases may be able to communicate with macro eNBs, and small cell eNBs. In some cases, UEs may be able to utilize multiple eNBs simultaneously and may be able to communicate using both low frequency carrier signals and high frequency carrier signals either separately or simultaneously.

Communication paths between UEs 620 and eNBs 610 are shown as either a dotted line or a solid line with double arrows. The dotted lines indicate the exchange of control data (e.g. location data, beamforming parameter data, or any other data which facilitates in establishing the connection between a small cell eNB and a UE), whereas the solid lines indicate the exchange of actual call data or other payload data. In some aspects, the control data may be exchanged at a low frequency, such as the frequency of a normal mobile device operations in a cellular network (e.g. 400 MHz-3 GHz). Whereas the established connection for payload data is implemented at a higher frequency. In some cases the high frequency may be millimeter wave (which may include near millimeter wave) frequencies (e.g. 20 GHz-60 GHz).

In accordance with one aspect, UE 620 of small cell 602 supports communications which exchange control/location data and payload data. Control/location information may include any information that may be used to assist the connection between UE 620 and eNB of small cell 602 both for establishing and maintaining the connection. For example, control/location information may include global positioning system (GPS) data which provides for the actual location of UE 620. Further, other data which may be used to assist in locating UE 620 may be provided and utilized such as coarse channel properties which may include path loss information, delay profile information, line of sight (LOS) information, information regarding multipath signals and the like. Such information may be utilized to determine the location of UE 620 in order to better direct/steer the beam which conveys the transmission toward UE 620 and to otherwise fine tune the connection between eNB 610 and UE 620. Further, location information may be provided by a different network device, such as macro eNB 620. Such information may include information gained from triangulating UE 620 within the communication network, or any other information which may be obtained by a network device.

Course channel information may further include properties which allow for angle of arrival (AOA) and angle of departure (AOD) values to be determined. For example, uplink signal and/or channel feedback information may be utilized to derive AOA/AOD. Such values may also be used, alone or in conjunction with other location data, for coarse initial beam alignment the communication beam.

It is noted that control/location information may be transmitted using multiple methods. For example, location information such as GPS data may be sent as part of a MAC header, may be transmitted separately using a variety of feedback formats (such as channel quality indicator (CQI) format), and may be transmitted as part of other feedback communications.

Further, in some aspects location data may be reduced to provide the most important bits. For example, beamforming direction may require only accuracy to a few meters, then more refined location information can be omitted in the feedback, e.g. only transmit most significant bits of GPS location information. In another example, GPS data may include information already known by a respective eNB such as general geographic location (e.g. country, state, city, etc.). Therefore, the length of a GPS latitude/longitude value may be reduced to remove coarse information that is already known within the small range of a cell, e.g. 1-2 km.

It is appreciated that at high frequencies the beam width of highly dimensional arrays is on the order of a few degrees. Accordingly, utilizing the control/location data to steer beam 620 in order to establish a high frequency connection provides for an efficient method to determine the beam direction without having to make excessive layered/successive beam tracing. Moreover, location information of eNB 610 may be provided to UE 620 to instruct the UE regarding one or more of beam direction of outgoing transmissions and/or beam width, channel configuration information for downlink measurements, and channel configuration information for the uplink channel. Once the connection is established, data may be transferred between UE 620 and eNB 610 at a much faster rate.

After establishing the high frequency connection, UE 620 and eNB 610 of small cell 602 may continue to exchange control/location information in order to maintain alignment of the beams. For example, the control data exchanged may be continually or periodically fed back to a eNB when changes in the environment have occurred, such as due to motion of UE 620, a reduction of signal strength, etc. Additionally, such exchanges may be prompted to occur after a condition in the communication network has crossed over a pre-determined threshold (e.g. a significant drop in signal strength, a degree of change in location of a UE, and the like).

In accordance with another aspect, small cell 603 supports data communications with UE 620 only at a high frequency. UE 620 also communicates with macro eNB 610 at a normal operating frequency of network 600. In this case, UE 620 of small cell 603 may be configured to transmit and/or receive control/location information (e.g. the control/location information described above with respect to small cell 602) with macro eNB 610, while high frequency data transmissions are exchanged with eNB 610 of small cell 603.

An example connection flow with respect to UE 620 of small cell 603 may include the UE establishing a connection with macro eNB 610 via an existing reliable link (e.g. WiFi, UTMS, LTE, etc.). UE 620 may exchange, for example, GPS information with macro eNB to determine whether a possible high frequency connection is possible. A relative location to the nearest small cell eNB 610 is calculated by the macro eNB 610 or a central controller for a cluster of eNBs. Once it is determined that UE 620 is within range of small cell 603 macro eNB 610 may exchange relative position information and other inter-frequency handover information with small cell eNB 610. Additionally, macro eNB 610 may provide UE 620 with relevant information to allow UE 620 to direct communications to eNB 610 of small cell 603. Small cell eNB and UE may calculate relative LOS angles and corresponding vectors and use these values to beamform around the LOS path and establish a link (e.g., beam 631*a* facilitating a communication link between small cell eNB 610 and UE 620 in cell 603).

As describe above, once a link is established location based beam tracking may be implemented. Such beam tracking may be utilized to beamform the high frequency link in the event that it is determined that a UE moves (e.g., the location information indicates a position for which the current beam is non-optimal or otherwise unsatisfactory), if the signal strength otherwise drops, etc. For example, UE 620 may move within small cell 603 as shown by arrow 604. During such movement, location information may be sent again to macro UE 610, relative locations may be determined, etc. From this information it may be determined that one or more aspect (e.g., azimuthal angle, elevation angle, beamwidth, etc.) of the beam used in establishing the link is to be changed to facilitate maintaining the link (e.g., resulting in beam 631b directed to the new position of UE 620 in cell 603 to facilitate maintaining the communication link). Such beam tracking may be implemented periodically, continuously, on demand from an eNB or UE, or in any other manner which provides for a reliable connection while preferably not over-burdening network communications.

In one aspect, once the high frequency communication link is established, the control/location data communications may be handed off to eNB 610 of small cell 603 and may then be exchanged at the high frequency. In this case, the control data may utilized in a manner that it continues to assist eNB 610 of small cell 603 with directing the beam to maintain communications.

In one aspect, because macro eNB 610 can receive location information from various UEs and make determinations regarding whether a UE is in range of a small cell, eNB 610 may also utilize this information for power management of a small cell eNB. For example, UE 620 within small cell 602 may move, as illustrated by arrow 605, to be outside of small cell 602. Upon determining that no UE is in range of a small cell 602 (or that a UE is not moving toward the small cell), macro eNB 610 may cause the small cell eNB to deactivate.

Conversely, upon a UE entering a small cell (or moving toward the small cell), again as illustrated by arrow 605, macro eNB 610 may cause the small cell eNB to activate in response to analyzing the aforementioned location information and determining the UE's proximity to the small cell. Such an activation may be implemented upon a UE approaching or becoming within a pre-determined distance of a small cell, or upon becoming within range of the small cell. Further, in one aspect, instead of simply activating/deactivating a small cell eNB, location information of UEs may be utilized to trigger scheduling of RACH/SRS operations to allow for small cell eNB measurements to determine the need to activate for potential servicing of a UE. Once activated, the small cell eNB may utilize location information to establish a beam direction toward a UE to establish communications as described above.

In the example above, it is described how the macro cell, macro eNB 610, can help determining the activation/deactivation of the small cell, such as small cell 602, based on the location information. In yet another aspect, location information received on one frequency may help activate/deactivate communications on another frequency.

It is appreciated that the illustrated networks are scalable and may include numerous eNBs. In some aspects, the control of activation/deactivation may be administered by a central processing controller system which controls a cluster of eNBs. Note that such activation and deactivation based on location information can be also used for any frequency (not necessarily for high or millimeter wave frequency), and can work with single carrier (not necessarily for multi-carrier deployment).

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
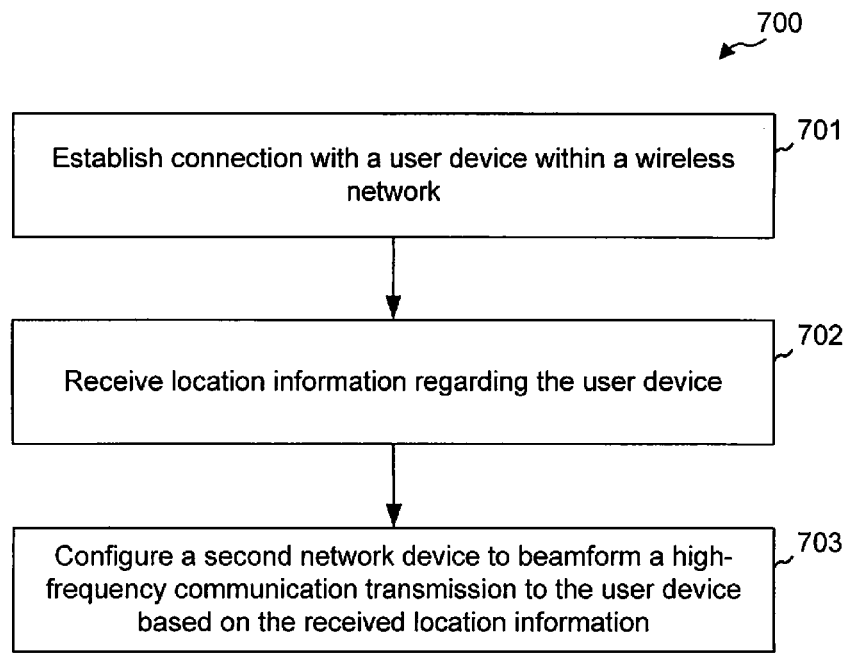
FIG. 7 is a functional block diagram illustrating example blocks executed to implement one aspect of the present disclosure.

In accordance with one or more aspects of the aspects described herein, with reference to FIG. 7, there is shown a methodology 700, operable by a network device for implementing wireless communications. Method 700 may include, at 701, establishing a connection with a user device within a wireless network. Additionally, method 700 may include, at 702, receiving location information regarding the user device. Further, method 700 may include at 703, configuring a second network device to beamform a high-frequency communication transmission to the user device based on the received location information.

In related aspects, the establishing of a connection with a user device may be implemented at a low frequency. Additionally, location information may include information from a UE, and/or information from a separate source. Location information may include one or more of global position satellite information, communication channel information, and network triangulation information. Further, in some aspects, location information of a UE may be provided to a network device in a MAC header, as part of channel feedback communication, etc.

The method may include one or more various optional steps such as, calculating the relative location of the user device with respect to a high-frequency base station by a central controller of a cluster of network devices, calculating relative line of sight angles between the user device and a second network device (e.g. a high frequency base station), determining whether the user device is in range of the second network device, activating the second network device when the user device is determined to be in range of a second network device, deactivating the second network device when the user device is determined to not be in range of the second network device, and beam tracking the user device to compensate for user device movement (which may be done periodically, continuously, or in response to threshold observations).

It is further appreciated that method 700 may be carried out by various hardware devices such as eNBs 110 and 610 described above. Accordingly, such hardware may also be considered a means for establishing a connection with a user device within a wireless network, receiving location information regarding the user device, and configuring a second network device to beamform a high-frequency communication transmission to the user device based on the received location information.

Figure 8:
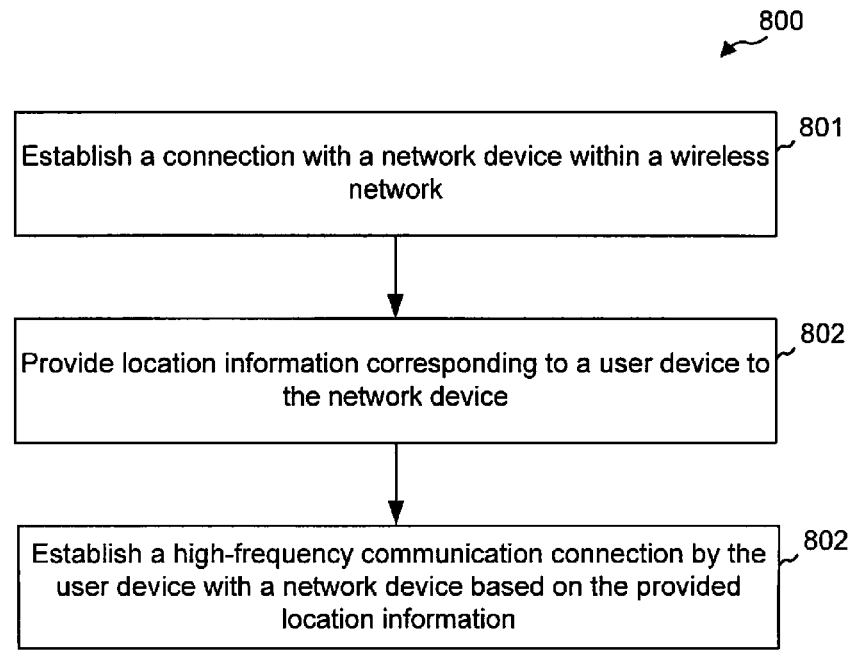
FIG. 8 is a functional block diagram illustrating example blocks executed to implement one aspect of the present disclosure.

In accordance with one or more aspects of the aspects described herein, with reference to FIG. 8, there is shown a methodology 800, operable by a user device, for implementing wireless communications. Method 800 may include, at 801, establishing a connection with a network device within a wireless network. Method 800 may also include, at 802, providing location information corresponding to the user device to the network device. Moreover, method 800 may include, at 803, establishing a high-frequency communication connection by the user device with a network device which has been beam-formed based on the provided location information.

In related aspects, the provided location information may include one or more of global position satellite information, communication channel information, and network triangulation information. Such information may be provided as part of a low frequency communication. Additionally, location information may be provided in a manner which reduces the location information to include significant data bits. Location information may be provided in a MAC header, as part of feedback data and the like. Further, method 800 may include additional steps such as providing additional location information to maintain the established high-frequency communication.

It is further appreciated that method 800 may be carried out by various hardware devices such as UEs 120 and 620 described above. Accordingly, such hardware may also be considered a means for establishing a connection with a network device within a wireless network, providing location information corresponding to the user device to the network device and establishing a high-frequency communication connection with a network device which has been beam-formed based on the provided location information.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in the FIGS. may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

What is claimed is:

1. A method of wireless communication, comprising:
   establishing, by a network device, a connection with a user device within a wireless network;
   receiving, by the network device, location information regarding the user device; and
   configuring, by the network device, a second network device to beamform a high-frequency communication transmission to the user device based on the received location information, including exchanging, by the network device with the second network device, the location information.

2. The method of claim 1 wherein the establishing of a connection with a user device is implemented at a low frequency.

3. The method of claim 1 further including calculating the relative location of the user device with respect to a high-frequency base station by a central controller of a cluster of network devices.

4. The method of claim 1 further including determining whether the user device is in range of the second network device.

5. The method of claim 4 further including activating the second network device when the user device is determined to be in range of the second network device.

6. The method of claim 4 further including deactivating the second network device when the user device is determined to not be in range of the second network device.

7. The method of claim 1 wherein location information includes information received from a source other than the user device.

8. The method of claim 1 wherein location information includes at least one of global position satellite information, communication channel information, and network triangulation information.

9. The method of claim 1 wherein location information is at least one of:
   provided in a MAC header; and
   is part of a channel feedback communication.

10. The method of claim 1 further including beam tracking the user device to compensate for user device movement.

11. The method of claim 10 wherein beam tracking is implemented in response to one of:
    signal strength falling below a pre-determined threshold; and
    a change in location of a user device exceeds a pre-determined threshold.

12. A method of wireless communication, comprising:
    establishing, by a user device, a connection with a network device within a wireless network;
    providing, by the user device, location information corresponding to the user device to the network device; and
    establishing a high-frequency communication connection by the user device with a second network device which has been beam-formed based on the provided location information at least in part by exchanging, by the network device with the second network device, the location information.

13. The method of claim 12 wherein the provided location information includes at least one of global position satellite information, communication channel information, and network triangulation information.

14. The method of claim 12 wherein the provided location information is reduced to include significant data bits.

15. The method of claim 12 wherein the provided location information comprises bitwidth reduced global positioning system (GPS) location information, the bitwidth reduced GPS location information having at least one of a least significant bit (LSB) or a most significant bit (MSB) removed.

16. The method of claim 12 wherein location information is at least one of:
    provided in a MAC header; and
    is part of a channel feedback communication.

17. The method of claim 12 wherein the establishing of a connection with the network device is implemented at a low frequency.

18. An apparatus comprising:
    means for establishing, by a network device, a connection with a user device within a wireless network;
    means for receiving, by the network device, location information regarding the user device; and
    means for configuring, by the network device, a second network device to beamform a high-frequency communication transmission to the user device based on the received location information, including means for exchanging, by the network device with the second network device, the location information.

19. The apparatus of claim 18 wherein the means for establishing the connection with a user device is implemented at a low frequency.

20. The apparatus of claim 18 further including means for calculating the relative location of the user device with respect to a high-frequency base station by a central controller of a cluster of network devices.

21. The apparatus of claim 18 further including a means for determining whether the user device is in range of the second network device.

22. The apparatus of claim 21 further including:
    means for activating the second network device when the user device is determined to be in range of the second network device; and
    means for deactivating the second network device when the user device is determined to not be in range of the second network device.

23. The apparatus of claim 18 wherein location information includes at least one of:
    information received from a source other than the user device; and
    at least one of global position satellite information, communication channel information, and network triangulation information, and
    wherein the location information is one of:
    provided in a MAC header; and
    is part of a channel feedback communication.

24. The apparatus of claim 18 further including a means for beam tracking the user device to compensate for user device movement, wherein the means for beam tracking is implemented in response to at least one of:
    signal strength falling below a pre-determined threshold; and
    a change in location of a user device exceeds a pre-determined threshold.

25. An apparatus comprising:
- means for establishing, by a user device, a connection with a network device within a wireless network;
- means for providing, by the user device, location information corresponding to the user device to the network device; and
- means for establishing a high-frequency communication connection by the user device with a second network device which has been beam-formed based on the provided location information at least in part by exchanging, by the network device with the second network device, the location information.

26. The apparatus of claim 25 wherein the provided location information includes at least one of global position satellite information, communication channel information, and network triangulation information.

27. The apparatus of claim 25 wherein the provided location information is reduced to include significant data bits.

28. The apparatus of claim 25 wherein the provided location information comprises bitwidth reduced global positioning system (GPS) location information, the bitwidth reduced GPS location information having at least one of a least significant bit (LSB) or a most significant bit (MSB) removed.

29. The apparatus of claim 25 wherein the provided location information is at least one of:
- provided in a MAC header; and
- is part of a channel feedback communication.

30. The apparatus of claim 25 wherein the means for establishing the connection with the network device is implemented at a low frequency.

* * * * *